United States Patent
Yasuda et al.

(10) Patent No.: US 10,545,514 B2
(45) Date of Patent: Jan. 28, 2020

(54) FLOW RATE CONTROL APPARATUS, FLOW RATE CONTROL METHOD, AND PROGRAM RECORDING MEDIUM

(71) Applicant: HORIBA STEC, Co., Ltd., Kyoto-shi, Kyoto (JP)

(72) Inventors: Tadahiro Yasuda, Irvine, CA (US); Bill White, Irvine, CA (US); Patrick Lowery, Irvine, CA (US); Maximilian Gundlach, Irvine, CA (US); Ryan Owens, Irvine, CA (US)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 51 days.

(21) Appl. No.: 16/048,750

(22) Filed: Jul. 30, 2018

(65) Prior Publication Data

US 2019/0033896 A1  Jan. 31, 2019

(30) Foreign Application Priority Data

Jul. 31, 2017 (JP) .................................. 2017-147801

(51) Int. Cl.
*F16K 31/02* (2006.01)
*G05D 7/06* (2006.01)
(Continued)

(52) U.S. Cl.
CPC ........... *G05D 7/0664* (2013.01); *G01F 1/363* (2013.01); *G01F 15/005* (2013.01); *G01F 22/02* (2013.01);
(Continued)

(58) Field of Classification Search
CPC .... G05D 7/0664; G05D 7/0635; G01F 22/02; G01F 15/005; G01F 1/363; G01F 25/0007; G05B 19/416; G05B 2219/37371
(Continued)

(56) References Cited

U.S. PATENT DOCUMENTS 7,204,158 B2 * 4/2007 Morgan ............... G05D 7/0635
406/10
8,356,623 B2 * 1/2013 Isobe .................... G01F 1/6842
137/486
(Continued)

FOREIGN PATENT DOCUMENTS

JP 2004280688 A 10/2004

*Primary Examiner* — Minh Q Le
(74) *Attorney, Agent, or Firm* — Alleman Hall Creasman & Tuttle LLP

(57) ABSTRACT

Provided is a flow rate control apparatus that includes a flow restrictor, a downstream side valve, a downstream side pressure sensor, first and second flow rate calculators, and a flow rate controller. The downstream side valve is disposed downstream of the flow restrictor in a flow path. The downstream side pressure sensor measures a pressure between the flow restrictor and the downstream side valve. The first flow rate calculator calculates a first flow rate of fluid flowing through the flow restrictor. The second flow rate calculator calculates a second flow rate of fluid flowing out of the downstream side valve on the basis of the first flow rate and the temporal variation in downstream side pressure measured by the downstream side pressure sensor. The flow rate controller controls the downstream side valve on the basis of a set flow rate and the second flow rate.

8 Claims, 4 Drawing Sheets

(51) Int. Cl.
  *G05B 19/416* (2006.01)
  *G01F 22/02* (2006.01)
  *G01F 15/00* (2006.01)
  *G01F 25/00* (2006.01)
  *G01F 1/36* (2006.01)

(52) U.S. Cl.
  CPC ....... *G01F 25/0007* (2013.01); *G05B 19/416* (2013.01); *G05D 7/0647* (2013.01); *G05B 2219/37371* (2013.01)

(58) Field of Classification Search
  USPC ................................. 137/487.5, 9, 12, 488
  See application file for complete search history.

(56) References Cited

U.S. PATENT DOCUMENTS

| | | | | |
|---|---|---|---|---|
| 8,794,261 B2 * | 8/2014 | Watanabe | | F17D 3/00 137/486 |
| 10,401,202 B2 * | 9/2019 | Monkowski | | G01F 1/34 |
| 2005/0189018 A1 * | 9/2005 | Brodeur | | G01F 1/363 137/487.5 |
| 2006/0237063 A1 * | 10/2006 | Ding | | G05D 11/132 137/487.5 |
| 2008/0140260 A1 * | 6/2008 | Ding | | G01F 1/68 700/282 |
| 2008/0250854 A1 * | 10/2008 | Ding | | G01F 1/48 73/198 |
| 2009/0112504 A1 * | 4/2009 | Ding | | G01F 22/02 702/100 |
| 2009/0250116 A1 * | 10/2009 | Hong | | G01F 1/363 137/12 |
| 2010/0080262 A1 * | 4/2010 | McDonald | | G01F 1/684 374/166 |
| 2010/0200083 A1 * | 8/2010 | Kouchi | | G01F 1/363 137/486 |
| 2011/0307104 A1 * | 12/2011 | Smirnov | | G05D 7/0635 700/282 |
| 2012/0216888 A1 * | 8/2012 | Ding | | G05D 7/0635 137/561 R |
| 2013/0085618 A1 * | 4/2013 | Ding | | C23C 16/45561 700/282 |
| 2013/0186486 A1 * | 7/2013 | Ding | | G01F 25/003 137/487 |
| 2014/0083514 A1 * | 3/2014 | Ding | | G05D 7/0647 137/12 |
| 2014/0190579 A1 * | 7/2014 | Ding | | G01F 25/003 137/487 |
| 2014/0373935 A1 * | 12/2014 | Nishino | | G05D 7/0664 137/102 |
| 2014/0374634 A1 * | 12/2014 | Ohtsuki | | G05D 7/0635 251/129.06 |
| 2015/0192932 A1 * | 7/2015 | Nishino | | G05D 7/0664 137/870 |
| 2016/0033973 A1 * | 2/2016 | Takijiri | | G05D 7/0635 137/10 |
| 2017/0010625 A1 * | 1/2017 | Monkowski | | G01F 1/34 |
| 2017/0343402 A1 * | 11/2017 | Takijiri | | F16K 37/005 |
| 2018/0173249 A1 * | 6/2018 | Hayashi | | G05D 7/0635 |
| 2018/0246531 A1 * | 8/2018 | Somani | | G05D 7/0623 |
| 2018/0253111 A1 * | 9/2018 | Goto | | G01F 25/0007 |
| 2018/0283914 A1 * | 10/2018 | Sugita | | G01F 1/00 |
| 2019/0196517 A1 * | 6/2019 | Hoke | | F16K 37/005 |
| 2019/0227577 A1 * | 7/2019 | Nagase | | G05B 19/416 |
| 2019/0243392 A1 * | 8/2019 | Ding | | C23C 16/45525 |
| 2019/0278305 A1 * | 9/2019 | Takijiri | | H01L 21/67017 |
| 2019/0331515 A1 * | 10/2019 | Smirnov | | G01F 1/6965 |

* cited by examiner

FLOW RATE CONTROL APPARATUS, FLOW RATE CONTROL METHOD, AND PROGRAM RECORDING MEDIUM

BACKGROUND OF THE INVENTION

Field of the Invention

The present invention relates to a flow rate control apparatus for controlling a flow rate of fluid, which is, for example, usable for a semiconductor manufacturing apparatus.

Background Art

A semiconductor manufacturing process employs a flow rate control apparatus in which various kinds of fluidic devices called mass flow controllers and a control mechanism are packaged for the purpose of controlling flow rates of various kinds of gases introduced into, for example, an etching chamber.

As a mass flow controller, there is, for example, one which includes a flow rate sensor disposed in a flow path, a valve disposed downstream of the flow rate sensor, and a flow rate controller designed to control a valve opening of the valve so that a measured flow rate measured by the flow rate sensor reaches a set flow rate as a target value (refer to Patent document 1).

The above mass flow controller needs improvement in response speed in order to ensure that a flow rate of actual gas flowing downward through the valve follows up the set flow rate as soon as possible.

Recently, however, a response speed needed in the semiconductor manufacturing process is very severe, and it becomes difficult to cope with the response speed by the mass flow controller provided with the flow rate control system as described above. The inventors of the present application have found, as a result of intensive studies of the reason therefor, that there is a principle problem as described below.

Specifically, with the above mass flow controller, the flow rate measured upstream of the valve is fed back to control the valve. A measuring point of the flow rate by the flow rate sensor deviates from a control point for flow rate through the valve by an installation interval of the flow rate sensor and the valve.

For example, when the flow rate sensor includes a flow restrictor, such as a laminar flow element, the operation of the flow restrictor for a predetermined period of time is needed to cause inflow and outflow of gas so as to apply pressure necessary for achieving the set flow rate in an internal volume between the flow restrictor serving as a measuring point and the valve serving as a control point.

Therefore, a time delay occurs until a change in flow rate occurred at the control point occurs at the measuring point at which the flow rate sensor is located. The valve opening of the valve is therefore continuously controlled all the time at the control point on the basis of information about a flow rate obtained before a predetermined period of time. Consequently, there is a limit on response speed.

PRIOR ART DOCUMENT

Patent Document

Patent Document 1: Japanese Unexamined Patent Publication No. 2004-280688

SUMMARY OF THE INVENTION

Problems to be Solved by the Invention

The present invention has been made to solve the above problem and has for its main object to provide a flow rate control apparatus with which an actual flow rate at the valve serving as the control point can be obtained with a smaller temporal delay than conventional ones, and a considerable improvement in response speed can be achieved by making the measuring point coincide with the control point.

Means of Solving the Problems

According to one aspect of the present invention, a flow rate control apparatus includes a flow restrictor, a downstream side valve, a downstream side pressure sensor, a first flow rate calculator, a second flow rate calculator, and a flow rate controller. The flow restrictor is disposed in a flow path. The downstream side valve is disposed downstream of the flow restrictor. The downstream side pressure sensor measures a pressure in a volume of the flow path between the flow restrictor and the downstream side valve. The first flow rate calculator calculates a first flow rate of fluid flowing through the flow restrictor. The second flow rate calculator calculates a second flow rate of fluid flowing out of the downstream side valve on the basis of the first flow rate and a temporal variation in a downstream side pressure measured by the downstream side pressure sensor. The flow rate controller controls the downstream side valve on the basis of a set flow rate and the second flow rate.

According to another aspect of the present invention, a flow rate control method uses a flow rate control apparatus including a flow restrictor disposed in a flow path, a downstream side valve disposed downstream of the flow restrictor, and a downstream side pressure sensor to measure a pressure in a volume of the flow path between the flow restrictor and the downstream side valve. The flow rate control method includes: a first flow rate calculation step of calculating a first flow rate of fluid flowing through the flow restrictor; a second flow rate calculation step of calculating a second flow rate of fluid flowing out of the downstream side valve on the basis of the first flow rate and a temporal variation in downstream side pressure measured by the downstream side pressure sensor; and a flow rate control step of controlling the downstream side valve on the basis of a set flow rate and the second flow rate.

With the above configuration, the temporal variation in downstream side pressure is determined on the basis of a difference between a flow rate of fluid flowing into a volume in the flow path between the flow restrictor and downstream side valve, and a flow rate of fluid flowing out of the volume.

Accordingly, the second flow rate calculator is capable of calculating the second flow rate of the fluid flowing out of the downstream side valve, which is the flow rate of the fluid flowing out of the volume, from the first flow rate, which is the flow rate of the fluid flowing into the volume, and the temporal variation in downstream side pressure.

Thus, the second flow rate, which is the flow rate at the downstream side valve serving as the control point, is obtainable with little temporal delay. The flow rate controller is therefore capable of controlling the downstream side valve by making the control point coincide with a measuring point, thereby improving response speed, for example, during a transient response than conventional ones.

As a specific configuration of the second flow rate calculator, there is one which includes a variation calculation section to calculate the temporal variation in downstream side pressure, and a flow rate computing section to calculate the second flow rate on the basis of a difference between the first flow rate and a converted flow rate calculated from the temporal variation in downstream side pressure.

In order to achieve robust control that after the second flow rate becomes stable at the set flow rate by the downstream side valve, the second flow rate is less likely to vary even upon occurrence of pressure variation on the upstream side of the flow restrictor, it is necessary to include an upstream side valve disposed upstream of the flow restrictor, an upstream side pressure sensor to measure a pressure in a volume of the flow path between the upstream side valve and the flow restrictor, and a pressure controller to control the upstream side valve on the basis of a set pressure and an upstream side pressure measured by the upstream side pressure sensor.

In order to prevent an increase in number of sensors while ensuring that the first flow rate calculator calculates an accurate first flow rate by a differential pressure between forward and backward sides of the flow restrictor, the first flow rate calculator is designed to calculate the first flow rate of fluid flowing through the flow restrictor on the basis of the upstream side pressure and the downstream side pressure.

In order that a self-diagnosis of abnormality in the interior can be carried out only by the flow rate control apparatus, it is necessary to further include a diagnosis section to diagnose the presence or absence of abnormality by comparing the first flow rate and the second flow rate in a state in which the downstream side valve is closed.

As another specific embodiment for obtaining the first flow rate in the present invention, there is one which further includes a flow rate detection mechanism to output a detection signal according to the first flow rate of fluid flowing through the flow restrictor. The first flow rate calculator is designed to calculate the first flow rate on the basis of a detection signal outputted from the flow rate detection mechanism.

In order that the same effect as the flow rate control apparatus according to the present invention can be obtained only by updating a program with respect to, for example, an existing flow rate control apparatus, it is necessary to use a program for a flow rate control apparatus including a flow restrictor disposed in a flow path, a downstream side valve disposed downstream of the flow restrictor, and a downstream side pressure sensor to measure a pressure in a volume of the flow path between the flow restrictor and the downstream side valve. The program causes a computer to function as a first flow rate calculator to calculate a first flow rate of fluid flowing through the flow restrictor, a second flow rate calculator to calculate a second flow rate of fluid flowing out of the downstream side valve on the basis of a first flow rate and a temporal variation in a downstream side pressure measured by the downstream side pressure sensor, and a flow rate controller to control the downstream side valve on the basis of a set flow rate and the second flow rate.

The program for a flow rate control apparatus may be electronically distributed or recorded in a recording medium, such as a CD, DVD, HDD, and flash memory.

Effects of the Invention

Thus, with the flow rate control apparatus according to the present invention, the second flow rate of fluid actually flowing through the downstream side valve that is the control point for flow rate is obtainable on the basis of the first flow rate and the temporal variation in downstream side pressure, and the response speed is improvable by carrying out control after making the measuring point coincide with the control point for flow rate.

DESCRIPTION OF THE EMBODIMENTS

A flow rate control apparatus 100 in a first embodiment of the present invention is described below with reference to FIGS. 1 and 2.

The flow rate control apparatus 100 in the first embodiment is intended to be used, for example, in order to supply gas to an etching chamber at a set flow rate in a semiconductor manufacturing process. Here, the set flow rate is a step signal that causes a stepwise rise or fall from a certain flow rate value to another flow rate value. The flow rate control apparatus 100 is designed to follow up the step signal within a predetermined period of time so as to satisfy, for example, quality of a semiconductor manufactured.

Figure 1:
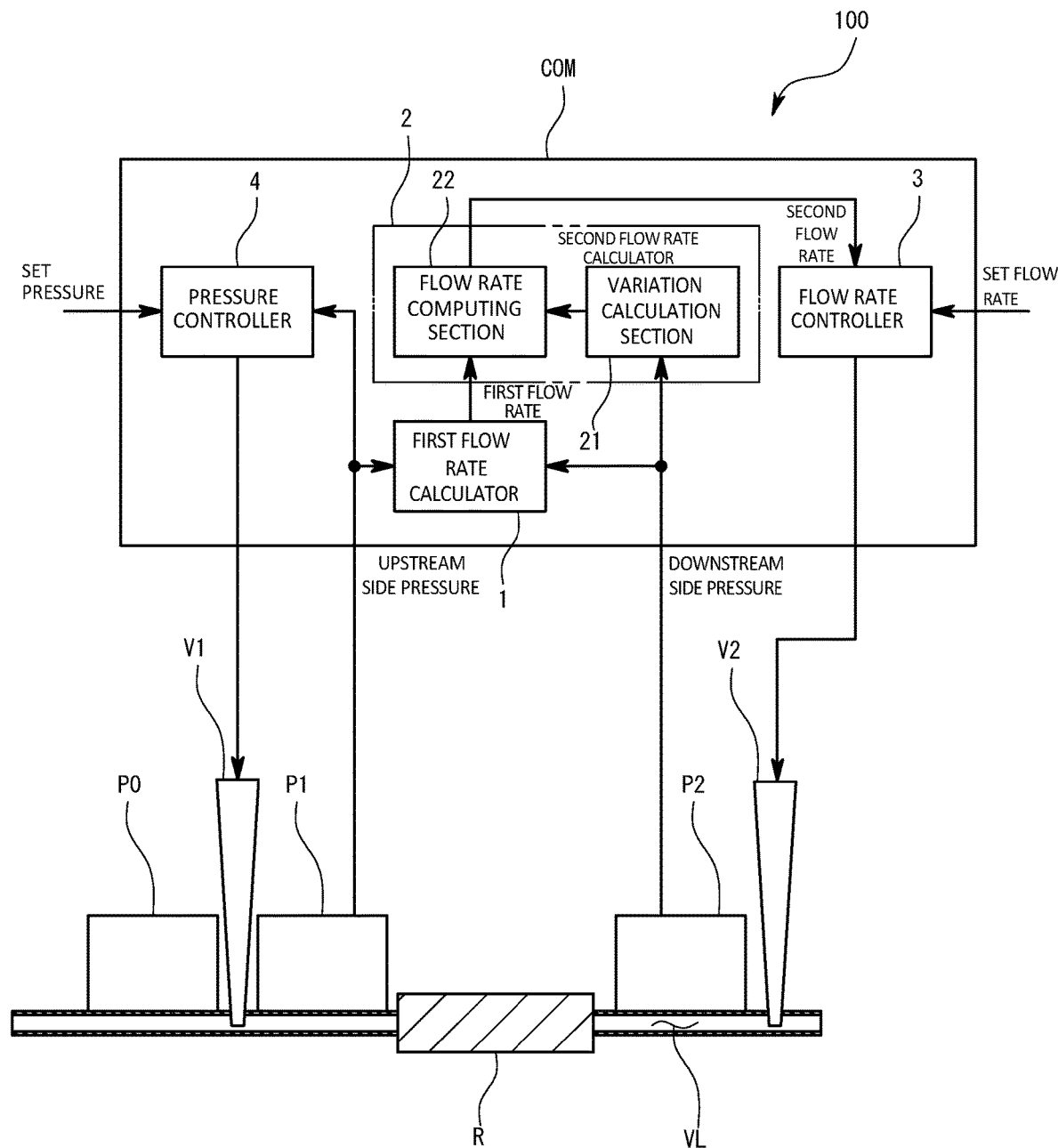
FIG. 1 is a schematic diagram illustrating a flow rate control apparatus in a first embodiment of the present invention.
Figure 2:
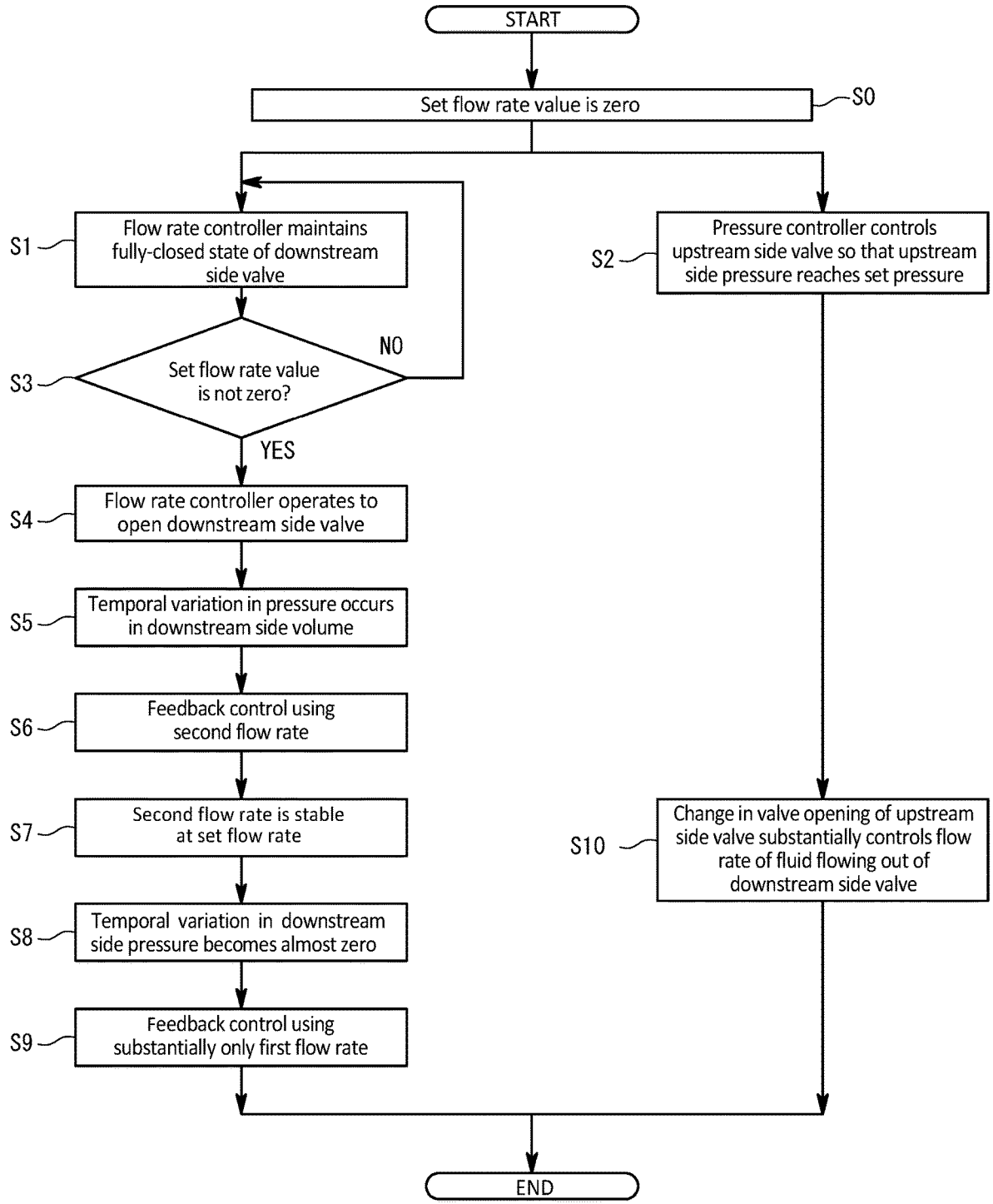
FIG. 2 is a flowchart illustrating control operations of the flow rate control apparatus in the first embodiment.

Specifically, the flow rate control apparatus 100 includes a sensor disposed in a flow path, a fluidic device composed of a valve, and a controller COM to govern control of the fluidic device as illustrated in FIG. 1.

A supply pressure sensor P0, an upstream side valve V1, an upstream side pressure sensor P1, a flow restrictor R, a downstream side pressure sensor P2, and a downstream side valve V2 are disposed in the order named from the upstream side in the fluid path. Here, the flow restrictor R is, for example, a laminar flow element, which generates a differential pressure according to a flow rate of gas flowing upstream thereof and a flow rate of gas flowing downstream thereof.

The supply pressure sensor P0 is designed to monitor pressure of gas supplied from the upstream side. The supply pressure sensor P0 may be omitted, for example, when a stable supply pressure is ensured.

The upstream side pressure sensor P1 is designed to measure an upstream side pressure that is a pressure of gas being charged in an upstream side volume that is a volume between the upstream side valve V1 and the flow restrictor R in the flow path.

The downstream side pressure sensor P2 is designed to measure a downstream side pressure which is a pressure of gas being charged in a downstream side volume VL that is a volume between the flow restrictor R and the downstream side valve V2 in the flow path.

Thus, the upstream side pressure sensor P1 and the downstream side pressure sensor P2 respectively measure the pressures of the two volumes formed by the upstream side valve V1, the flow restrictor R, and the downstream side valve V2. In other words, the upstream side pressure sensor P1 and the downstream side pressure sensor P2 are designed to respectively measure pressures in the volumes disposed ahead of and behind the flow restrictor R, respectively.

The upstream side valve V1 and the downstream side valve V2 are of the same type in the first embodiment, such as piezo valves whose valve element is driven relative to a valve seat by a piezo element. The upstream side valve V1 is designed to control the pressure in the upstream side volume on the basis of the upstream side pressure measured by the upstream side pressure sensor P1. The downstream side valve V2 disposed on the most downward side in the fluidic device is designed to control the entirety of a flow rate of gas flowing out of the fluidic device.

The controller COM is described in detail below.

The controller COM is a so-called computer including, for example, a CPU, memory, an AD/DA converter, and an input/output means. The controller COM functions as at least a first flow rate calculator 1, a second flow rate calculator 2, a flow rate controller 3, and a pressure controller 4 by cooperation among various kinds of devices during execution of a program for the flow rate control apparatus which is stored in the memory.

The first flow rate calculator 1 constitutes a so-called differential pressure flow rate sensor together with the upstream side pressure sensor P1, the flow restrictor R, and the downstream side pressure sensor P2. Specifically, the first flow rate calculator 1 is designed to calculate and output a first flow rate that is a flow rate of gas flowing through the flow restrictor R by using, as input, the upstream side pressure measured by the upstream side pressure sensor P1, and the downstream side pressure measured by the downstream side pressure sensor P2. As a calculation equation for flow rate used in the first flow rate calculator 1, an existing one is usable. The first flow rate calculated by the first flow rate calculator 1 changes continuously, and a predetermined temporal delay occurs with respect to an actual flow rate of gas passing through the downstream side valve V2, which is attainable by the control of the downstream side valve 2.

The second flow rate calculator 2 is designed to calculate and output a second flow rate that is a flow rate of gas flowing out of the downstream side valve V2 on the basis of the first flow rate calculated by the first flow rate calculator 1, and a downstream side pressure measured by the downstream side pressure sensor P2. More specifically, the second flow rate calculator 2 calculates the second flow rate on the basis of the fact that a constant multiple of a difference between the first flow rate, which is the flow rate of the gas flowing into the downstream side volume VL between the flow restrictor R and the downstream side valve V2, and the second flow rate which is the flow rate of the gas flowing out of the downstream side volume V1, is equal to a temporal variation in downstream side pressure.

Specifically, the second flow rate calculator 2 includes a variation calculation section 21 to calculate the temporal variation in downstream side pressure measured by the downstream side pressure sensor P2, and a flow rate computing section 22 to calculate the second flow rate on the basis of the first flow rate and the temporal variation in downstream side pressure.

The following is a description of a point that the second flow rate can be calculated on the basis of the first flow rate and the temporal variation in downstream side pressure.

A gas state equation provides $P_2 = nRT/V$ where P2 is the downstream side pressure, V is a volume of the downstream side volume VL, T is a temperature of gas, R is a gas constant, and n is a mass. The following equation is obtained by taking a time derivative of the above equation.

$$\frac{dP_2}{dt} = \frac{RT}{V}\frac{dn}{dt} \quad \text{[Equation 1]}$$

The following equation is obtained because the time derivative of the mass has a proportional relationship with the flow rate of gas flowing into and out of the downstream side volume VL per unit time.

$$\frac{dn}{dt} = a(Q_1 - Q_2) \quad \text{[Equation 2]}$$

where $Q_1$ is the first flow rate, $Q_2$ is the second flow rate, and a is a constant number. The following equation is obtained by solving the second flow rate $Q_2$ from the above equations.

$$Q_2 = Q_1 - A\frac{dP_2}{dt} \quad \text{[Equation 3]}$$

where A is a function that brings together R, T, V, and a. A value obtained by multiplying the temporal variation in downstream side pressure by the function A is a converted flow rate. This equation shows that the second flow rate can be calculated on the basis of the first flow rate that is an actual measurement value and the time derivative that is the temporal variation in downstream side pressure.

In the first embodiment, the variation calculation section 21 calculates a time derivative as the temporal variation in downstream side pressure measured by the downstream side pressure sensor P2. The time derivative can be calculated by taking a difference from time series data about the downstream side pressure.

The flow rate computing section 22 calculates the second flow rate from a constant number A, which is previously found by, for example, an experiment, the first flow rate $Q_1$ to be inputted, and a time derivative of the downstream side pressure inputted from the variation calculation section 21. The flow rate computing section 22 then outputs the second flow rate to the flow rate controller 3.

The flow rate controller 3 controls the downstream side valve V2 on the basis of the set flow rate set by a user, and the second flow rate inputted from the second flow rate calculator 2. Specifically, the flow rate controller 3 controls the downstream side valve V2 so as to reduce deviation between the set flow rate and the second flow rate, by a feedback of the second flow rate that is a flow rate of gas flowing out of the downstream side valve V2.

The pressure controller 4 controls the upstream side valve V1 on the basis of a set pressure set by the user, and the upstream side pressure measured by the upstream side pressure sensor P1. Specifically, the pressure controller 4 controls the upstream side pressure so as to reduce deviation between the set pressure and the upstream side pressure, by a feedback of the upstream side pressure. Here, the set pressure is set on the basis of a pressure difference that needs to be held between forward and backward sides of the flow restrictor R when the second flow rate is stable at the set flow rate.

An example of control operations when the downstream side valve V2 is fully closed and the second flow rate is changed from a zero state to a predetermined flow rate is described below with reference to the flowchart of FIG. 2.

While the value of the set flow rate is zero (step S0), the flow rate controller 3 is designed to prevent gas from flowing out of the downstream side valve V2 by maintaining the downstream side valve V2 in a fully closed state (step S1).

The pressure controller 4 is designed to cause the gas to flow into the upstream side volume by controlling the valve opening of the upstream side valve V1 so that the pressure in the upstream side volume reaches the set pressure (step S2).

When the set flow rate is stepwise changed from zero to the predetermined value (step S3), the flow rate controller 3 is designed to open the downstream side valve V2 so that the first flow rate obtainable from a differential pressure of the flow restrictor R, and the second flow rate, which is a flow rate at the control point to be calculated from the temporal variation in downstream side pressure reach the predetermined value of the set flow rate (step S4). The first flow rate is a flow rate of the gas flowing through the flow restrictor R by using, as input, the upstream side pressure measured by the upstream side pressure sensor P1, and the downstream side pressure measured by the downstream side pressure sensor P2.

Here, the gas flows out of the downstream side volume VL when the downstream side valve V2 is opened. Accordingly, the downstream side pressure becomes low, thus causing the temporal variation in downstream side pressure (step S5). Specifically, in a transient response state in which the gas starts flowing, the second flow rate has a value which is different from the first flow rate and to which the temporal variation of the downstream side pressure is added.

Upon feedback control based on the second flow rate (step S6), a change in flow rate at the downstream side valve V2 is reflected promptly to the control of the valve opening of the downstream side valve V2 because the measuring point for flow rate coincides with the control point. This follows that the second flow rate becomes stable at the predetermined value of the set flow rate in a short period of time (step S7).

In cases where the second flow rate is stable at the predetermined value of the set flow rate, an amount of gas flowing out of the downstream side volume VL is balanced with an amount of gas flowing into the downstream side volume VL. Therefore, the temporal variation in downstream side pressure becomes approximately zero (step S8). Specifically, the second flow rate is substantially equal to the first flow rate, and the flow rate controller 3 carries out feedback control of the downstream side valve V2 by using the first flow rate (step S9). Thus, the flow rate controller 3 controls the valve opening of the downstream side valve V2 on the basis of the first flow rate calculated from a differential pressure between the forward and backward sides of the flow restrictor R, and the second flow rate calculated from the difference in temporal variation in downstream side pressure. Therefore, a flow rate to be fed back changes naturally between when a pressure change occurs in the downstream side volume VL and when a pressure in the downstream side volume VL is stable. In other words, it can be said that the flow rate control by the flow rate controller 3 changes naturally from second flow rate control to first flow rate control.

The pressure controller 4 also controls the valve opening of the upstream side valve V1 independently of the flow rate controller 3. While the second flow rate is stable at the predetermined value of the set flow rate, control is carried out so that the flow rate of gas flowing out of the downstream side valve V2 can be held constant by a change in the valve opening of the upstream side valve V1 (step S10).

With the flow rate control apparatus 100 in the first embodiment so configured, the second flow rate that is the flow rate of the gas flowing out of the downstream side valve V2 can be calculated from the first flow rate being measured actually and the temporal variation in downstream side pressure. Because the downstream side valve V2 is controlled by the feedback of the second flow rate that is the flow rate at the downstream side valve V2 as the control point, no temporal delay occurs between an actual flow rate and a flow rate being fed back, thereby making it possible to improve a follow-up speed with respect to a change in set flow rate than conventional ones. Consequently, it becomes possible to achieve a response speed needed for the semiconductor manufacturing process.

Additionally, pressure variation is less likely to occur because the control is carried out so that the pressure on the upstream side of the flow restrictor R is held at the set pressure all the time by the upstream side valve V1. After the second flow rate becomes stable at the set flow rate by the control of the downstream side valve V2, it is easy to maintain the flow rate obtained at that time. Specifically, it is possible to enhance robustness of the control of the flow rate of the gas flowing out of the downstream side valve V2.

Figure 3:
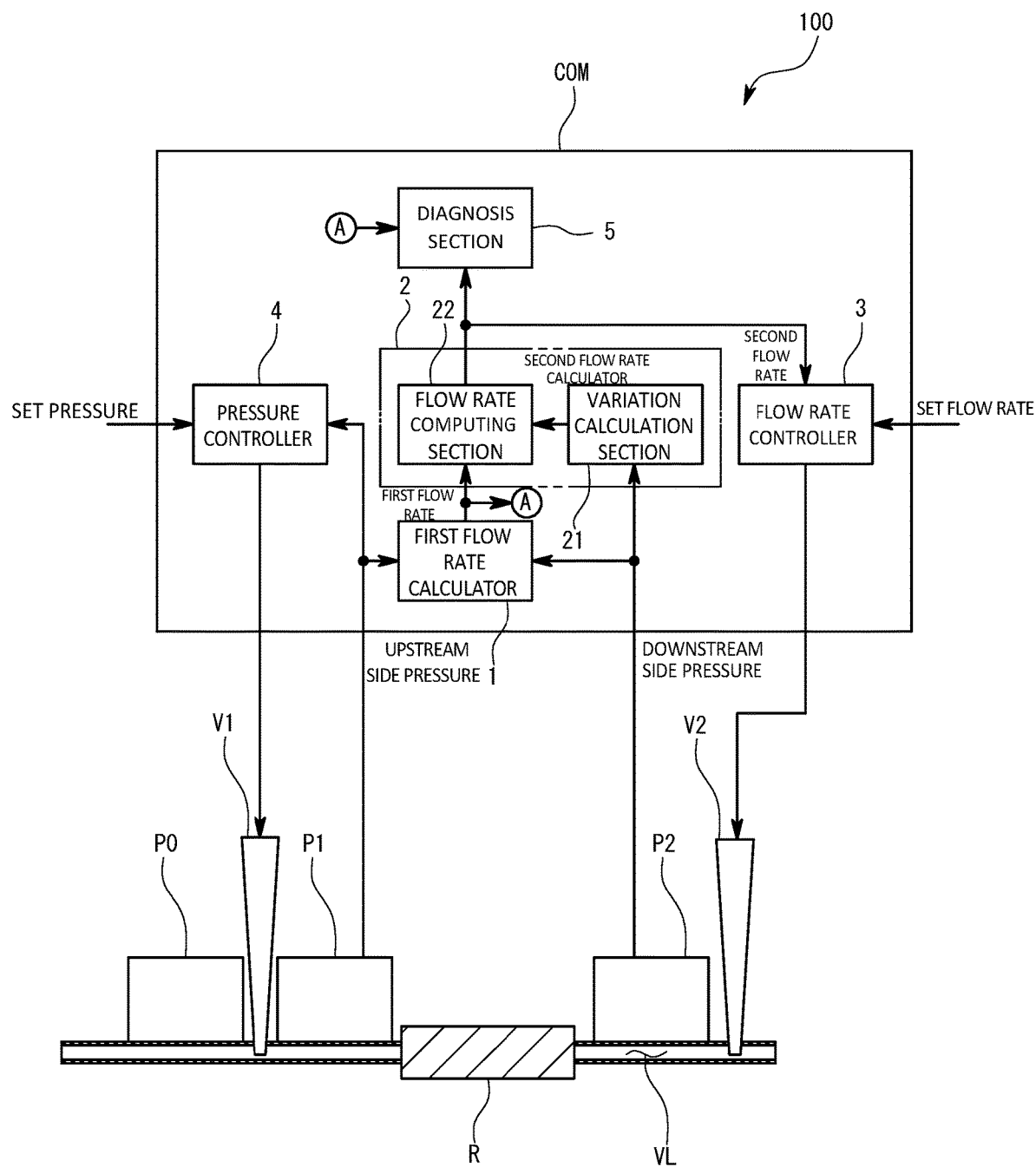
FIG. 3 is a schematic diagram illustrating a flow rate control apparatus in a second embodiment of the present invention.

A second embodiment of the present invention is described below with reference to FIG. 3. In FIG. 3, the same reference numerals have been used for the components as described in the first embodiment.

A flow rate control apparatus 100 in the second embodiment includes a self-diagnosis function that is the function for diagnosing a self-state from information obtained from a sensor included therein without the need to add an external sensor. Specifically, as illustrated in FIG. 3, the flow rate control apparatus 100 further includes a diagnosis section 5 to diagnose the presence or absence of abnormality by comparing the first flow rate and the second flow rate in a state in which the downstream side valve V2 is closed. No gas flows out of the downstream side volume VL in the state in which the downstream side valve V2 is closed. Hence, there is little difference between the first flow rate and the second flow rate unless each sensor is damaged. The diagnosis section 5 is therefore designed to diagnose that any one of the upstream side pressure sensor P1, the downstream side pressure sensor P2, and the downstream side valve V2 is damaged when the difference between the first flow rate and the second flow rate exceeds a predetermined threshold value.

With the flow rate control apparatus 100 in the second embodiment so configured, it is possible to diagnose whether abnormality, such as damage, occurs in a fluidic device by comparing various kinds of flow rates obtainable from the interior.

Figure 4:
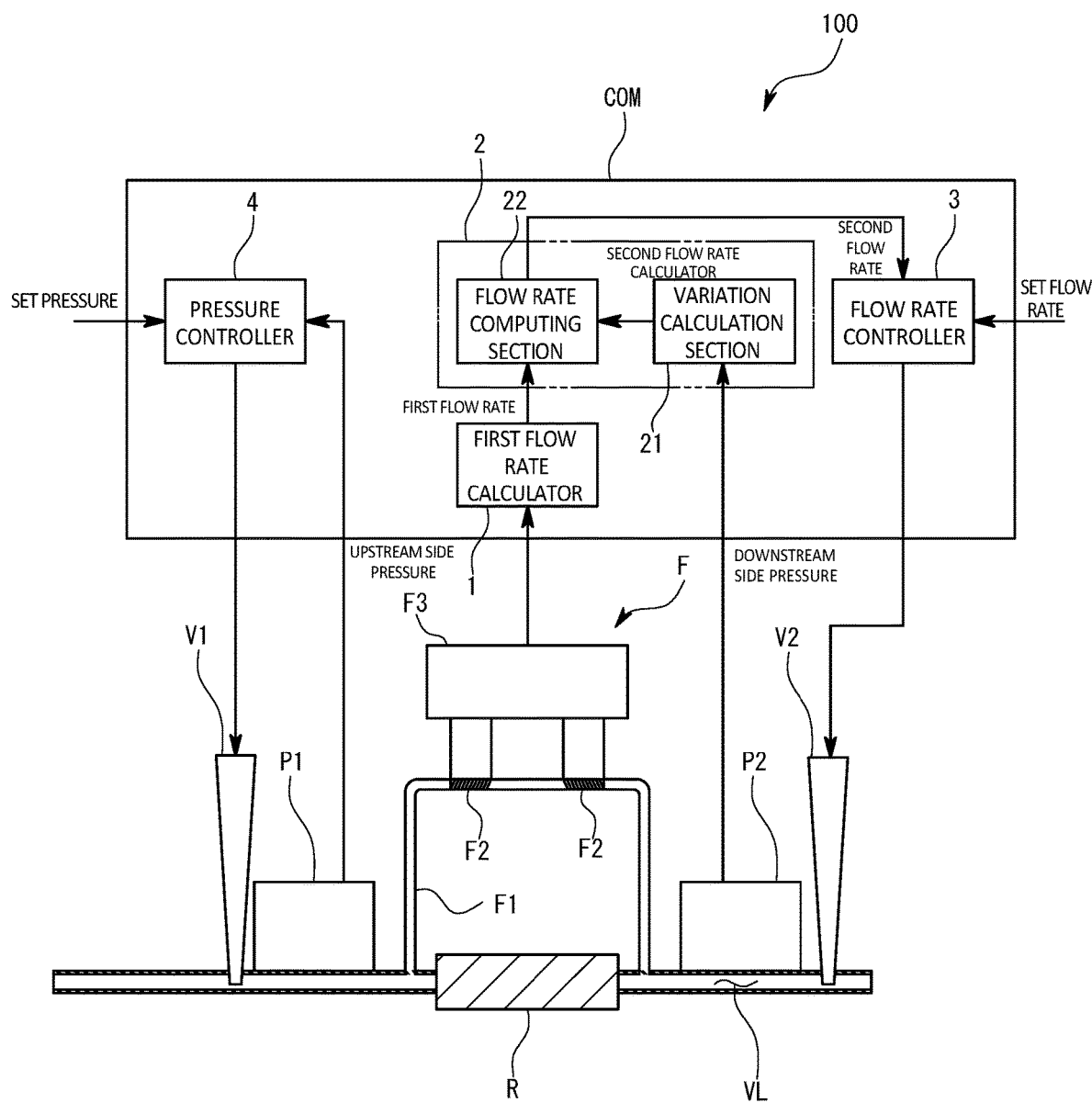
FIG. 4 is a schematic diagram illustrating a flow rate control apparatus in a third embodiment of the present invention.

A third embodiment of the present invention is described below with reference to FIG. 4.

A flow rate control apparatus 100 in the third embodiment is different from the first embodiment in principle for calculating the first flow rate. Specifically, the flow rate control apparatus 100 in the third embodiment includes a flow rate detection mechanism F for separately measuring a flow rate, instead of using a measured value by pressure sensors disposed ahead of and behind the flow restrictor R. The first flow rate calculator 1 is designed to calculate the first flow rate on the basis of output from the flow rate detection mechanism F.

Specifically, the flow rate detection mechanism F in the third embodiment includes a fine tube F1, two heat transfer coils F2, and a flow rate detector F3. The fine tube F1 is disposed by being branched so as to run across a forward side and a backward side of the flow restrictor R. The heat transfer coils F2 are wound around the fine tube F1. The flow rate detector F3 is composed of a bridge circuit designed to maintain these two heat transfer coils F2 at a predetermined temperature. A voltage applied to each of the heat transfer coils F2 changes according to a flow rate of fluid flowing through the fine tube F1. The first flow rate calculator 1 calculates the first flow rate on the basis of a difference in voltage to be outputted from the flow rate detector F3. Specifically, a thermal flow rate sensor is made up of the flow rate detection mechanism F and the first flow rate calculator 1 in the third embodiment.

Even with the above configuration, it is possible to calculate the second flow rate that is a flow rate of fluid actually flowing through the downstream side valve V2 on the basis of the first flow rate and the temporal variation in downstream side pressure measured by the downstream side pressure sensor P2. It is therefore possible to carry out flow rate control on the basis of the second flow rate without a temporal delay.

Other embodiments are described below.

Alternatively, the flow rate control apparatus may not include the upstream side valve but include, as the fluidic device, only the upstream side pressure sensor, the flow restrictor, the downstream side pressure sensor, and the downstream side valve. Specifically, the feedback control of flow rate on the basis of the second flow rate as described in the first embodiment may be carried out by the downstream side valve without carrying out pressure control under which a pressure on the upstream side of the flow restrictor. Even with this configuration, the effect of improving response speed is obtainable by making a flow rate measuring point coincide with a control point.

The fluid controlled by the flow rate control apparatus may be liquid without being limited to gas.

The downstream side valve may include a displacement sensor that makes it possible to detect a position of a valve element with respect to a valve seat, namely, a valve opening. The flow rate controller may be configured to control the downstream side valve so that a detected valve opening detected by the displacement sensor reaches a target valve opening by calculating the target valve opening that needs to be achieved at present on the basis of, for example, a deviation between the set flow rate and the second flow rate. With this configuration, an actual flow rate at the control point at which the downstream side valve is located can be obtained without causing a temporal delay by the second flow rate, and the valve opening itself of the downstream side valve can be controlled at high speed on the basis of the detected valve opening detected by the displacement sensor. Therefore, it becomes possible to cause a flow rate of fluid actually passing through the downstream side valve to follow up the set flow rate at higher speed.

Furthermore, a present valve opening of the downstream side valve can be detected, and the flow rate of gas actually passing through the downstream side valve can be obtained by the second flow rate. It is therefore also possible to accurately recognize a relationship between the valve opening and the second flow rate of the gas actually passing through. Hence, abnormality is detectable only with an extremely small change from a flow rate that needs to be achieved at a certain valve opening due to some damage, clogging, or the like. Specifically, it becomes possible to carry out highly accurate diagnosis than conventional ones by configuring so that the diagnosis section carries out a self-diagnosis within the flow rate control apparatus on the basis of the detected valve opening detected by the displacement sensor and the second flow rate.

Alternatively, the upstream side valve may also include a displacement sensor that makes it possible to detect a valve opening of the upstream side valve.

In order that a flow rate achieved by the flow rate control apparatus in an extremely short period of time according to the present invention can be directly supplied to, for example, a chamber, the downstream side valve needs to be disposed in the vicinity of an inlet port of the chamber in the flow path.

The embodiments may be modified, or alternatively, part or the entirety of each of the embodiments may be combined together without departing from the spirit and scope of the present invention.

LIST OF REFERENCE CHARACTERS 100 flow rate control apparatus
V1 upstream side valve
V2 downstream side valve
P1 upstream side pressure sensor
P2 downstream side pressure sensor
R flow restrictor
VL downstream side volume
1 first flow rate calculator
2 second flow rate calculator
21 variation calculation section
22 flow rate computing section
3 flow rate controller
4 pressure controller
5 diagnosis section

What is claimed is:

1. A flow rate control apparatus comprising:
   a flow restrictor disposed in a flow path;
   a downstream side valve disposed downstream of the flow restrictor;
   a downstream side pressure sensor to measure a pressure in a volume of the flow path between the flow restrictor and the downstream side valve;
   a first flow rate calculator to calculate a first flow rate of fluid flowing through the flow restrictor;
   a second flow rate calculator to calculate a second flow rate of fluid flowing out of the downstream side valve on a basis of the first flow rate and a temporal variation in a downstream side pressure measured by the downstream side pressure sensor; and
   a flow rate controller to control the downstream side valve on a basis of a set flow rate and the second flow rate.

2. The flow rate control apparatus according to claim 1, wherein the second flow rate calculator comprises:
   a variation calculation section to calculate the temporal variation in downstream side pressure, and
   a flow rate computing section to calculate the second flow rate on a basis of a difference between the first flow rate and a converted flow rate calculated from a temporal variation in downstream side pressure.

3. The flow rate control apparatus according to claim 1, further comprising:
   an upstream side valve disposed upstream of the flow restrictor;
   an upstream side pressure sensor to measure a pressure in a volume of the flow path between the upstream side valve and the flow restrictor; and
   a pressure controller to control the upstream side valve on a basis of a set pressure and an upstream side pressure measured by the upstream side pressure sensor.

4. The flow rate control apparatus according to claim 3, wherein the first flow rate calculator is designed to calculate the first flow rate of fluid flowing through the flow restrictor on a basis of the upstream side pressure and the downstream side pressure.

5. The flow rate control apparatus according to claim 1, further comprising:
  a diagnosis section to diagnose a presence or absence of abnormality by comparing the first flow rate and the second flow rate in a state in which the downstream side valve is closed.

6. The flow rate control apparatus according to claim 1, further comprising:
  a flow rate detection mechanism to output a detection signal according to the first flow rate of fluid flowing through the flow restrictor,
  wherein the first flow rate calculator is designed to calculate the first flow rate on a basis of a detection signal outputted from the flow rate detection mechanism.

7. A flow rate control method using a flow rate control apparatus comprising a flow restrictor disposed in a flow path, a downstream side valve disposed downstream of the flow restrictor, and a downstream side pressure sensor to measure a pressure in a volume of the flow path between the flow restrictor and the downstream side valve,
  the flow rate control method comprising:
  a first flow rate calculation step of calculating a first flow rate of fluid flowing through the flow restrictor;
  a second flow rate calculation step of calculating a second flow rate of fluid flowing out of the downstream side valve on a basis of the first flow rate and a temporal variation in a downstream side pressure measured by the downstream side pressure sensor; and
  a flow rate control step of controlling the downstream side valve on a basis of a set flow rate and the second flow rate.

8. A program recording medium having recorded therein a program used for a flow rate control apparatus comprising a flow restrictor disposed in a flow path, a downstream side valve disposed downstream of the flow restrictor, and a downstream side pressure sensor to measure a pressure in a volume of the flow path between the flow restrictor and the downstream side valve,
  the program recording medium causing a computer to function as
  a first flow rate calculator to calculate a first flow rate of fluid flowing through the flow restrictor;
  a second flow rate calculator to calculate a second flow rate of fluid flowing out of the downstream side valve on a basis of the first flow rate and the temporal variation in a downstream side pressure measured by the downstream side pressure sensor; and
  a flow rate controller to control the downstream side valve on a basis of a set flow rate and the second flow rate.

* * * * *